US011866139B2

(12) United States Patent
Gonring

(10) Patent No.: US 11,866,139 B2
(45) Date of Patent: Jan. 9, 2024

(54) MARINE BATTERY SYSTEM WITH BYPASS AND SAFE MODE

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 437 days.

(21) Appl. No.: 17/164,457

(22) Filed: Feb. 1, 2021

(65) Prior Publication Data
US 2022/0242538 A1    Aug. 4, 2022

(51) Int. Cl.
*B63H 21/17*    (2006.01)
*H01M 10/42*    (2006.01)

(52) U.S. Cl.
CPC .......... *B63H 21/17* (2013.01); *H01M 10/425* (2013.01); *H01M 10/4207* (2013.01); *H01M 2010/4271* (2013.01)

(58) Field of Classification Search
CPC .......................... B63H 21/17; H01M 10/4207; H01M 10/425; H01M 2010/427
See application file for complete search history.

(56) References Cited

U.S. PATENT DOCUMENTS

| | | | |
|---|---|---|---|
| 6,046,514 A | 4/2000 | Rouillard et al. | |
| 7,557,538 B2 | 7/2009 | Yau et al. | |
| 9,008,879 B2 | 4/2015 | Kumar et al. | |
| 9,054,555 B1 | 6/2015 | Ward | |
| 9,533,747 B2 | 1/2017 | Arbuckle et al. | |
| 2012/0091964 A1 | 4/2012 | Vance et al. | |
| 2015/0028817 A1* | 1/2015 | Brockerhoff | H01M 10/02 429/61 |
| 2017/0120770 A1 | 5/2017 | Huynh et al. | |

FOREIGN PATENT DOCUMENTS

| | | |
|---|---|---|
| CN | 106080244 | 3/2019 |
| DE | 102011011799 | 8/2012 |
| EP | 2477040 | 7/2012 |
| EP | 2353995 | 10/2012 |
| EP | 3699090 | 8/2020 |

OTHER PUBLICATIONS

Extended European Search Report issued in Corresponding EP Patent Application No. 22153770.7, dated Jun. 28, 2022.

* cited by examiner

*Primary Examiner* — Stephen P Avila
(74) *Attorney, Agent, or Firm* — Andrus Intellectual Property Law, LLP

(57) ABSTRACT

A power storage system for a marine vehicle is provided. The power storage system includes marine battery systems configured to provide energy to a marine vehicle load. Each marine battery system includes a battery and a three-position contactor configured to operate the marine battery system in one of a connected state, a disconnected state, or a bypass state. The power storage system further includes a controller coupled to each of the marine battery systems. The controller is configured to retrieve a preferred fault action for the marine battery systems, and in response to detection of a fault condition in the marine vehicle, control at least one three-position contactor of the marine battery systems according to the preferred fault action. The preferred fault action includes operating the marine battery system in the disconnected state or operating the marine battery system in the bypass state.

20 Claims, 9 Drawing Sheets

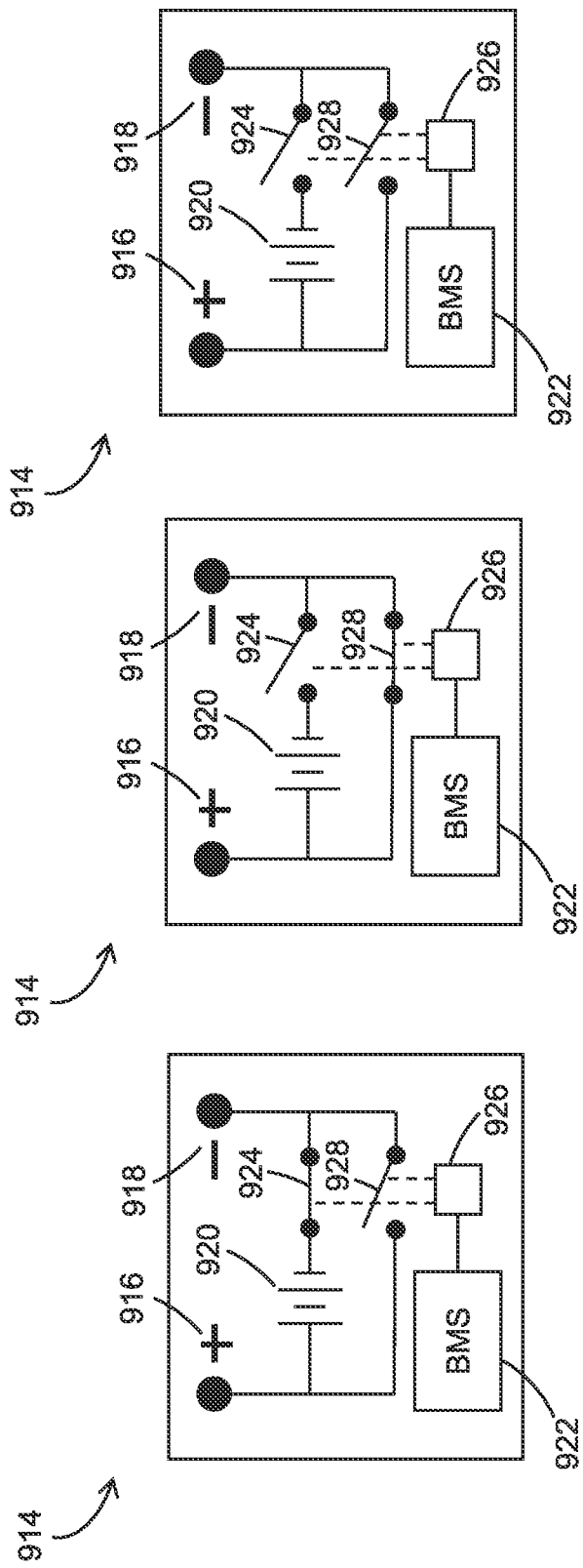

MARINE BATTERY SYSTEM WITH BYPASS AND SAFE MODE

FIELD

The present disclosure relates to battery systems for marine vessels, and more specifically, to systems and methods for operating the battery systems in bypass and safe modes when adverse conditions are detected.

BACKGROUND

U.S. Pat. No. 6,046,514 discloses a bypass apparatus and method for series connected energy storage devices. Each of the energy storage devices coupled to a common series connection has an associated bypass unit connected thereto in parallel. A current bypass unit includes a sensor which is coupled in parallel with an associated energy storage device or cell and senses an energy parameter indicative of an energy state of the cell, such as cell voltage. A bypass switch is coupled in parallel with the energy storage cell and operable between a non-activated state and an activated state. The bypass switch, when in the non-activated state, is substantially non-conductive with respect to current passing through the energy storage cell and, when in the activated state, provides a bypass current path for passing current to the series connection so as to bypass the associated cell. A controller controls activation of the bypass switch in response to the voltage of the cell deviating from a pre-established voltage setpoint. The controller may be included within the bypass unit or be disposed on a control platform external to the bypass unit. The bypass switch may, when activated, establish a permanent or a temporary bypass current path.

U.S. Pat. No. 7,557,538 discloses a fast battery charger in which each one of the battery charging sections comprises a charging branch and a bypassing branch, the battery charger is provided with enhanced charging monitory and control circuitry and method for performance elevation with minimal additional hardware overhead.

U.S. Pat. No. 9,054,555 discloses systems and methods for charging a rechargeable battery device on a marine vessel that utilize a rechargeable battery device, a charger charging the battery device, and a control circuit. The control circuit calculates an amount of current that is available to charge the battery device based upon an amount of current that is available from the shore power source and an amount of current that is being drawn from the shore power source by devices other than a voltage charger and limits the amount of current being drawn by the voltage charger to charge the battery device to an amount that is equal to or less than the calculated amount of current that is available to charge the battery device. The control circuit can repeatedly calculate the amount of current that is available to charge the battery device and limit the amount of current being drawn by a voltage charger to charge the battery device to thereby actively adjust an amount of charge applied to the battery device.

U.S. Pat. No. 9,533,747 discloses a hybrid propulsion system that has an internal combustion engine and an electric motor that each selectively powers a marine propulsor to propel a marine vessel. A plurality of batteries discharges current to power the motor. A controller is programmed to aggregate the recharge and/or discharge limits of a plurality of batteries and then operate the system according to a method that preferably prevents internal fault and disconnection of batteries in the plurality.

The above patents are hereby incorporated by reference in their entireties.

SUMMARY

This Summary is provided to introduce a selection of concepts that are further described hereinbelow in the Detailed Description. This Summary is not intended to identify key or essential features of the claimed subject matter, nor is it intended to be used as an aid in limiting the scope of the claimed subject matter.

According to one implementation of the present disclosure, a power storage system for a marine vehicle is provided. The power storage system includes marine battery systems configured to provide energy to a marine vehicle load. Each marine battery system includes a battery and a three-position contactor configured to operate the marine battery system in one of a connected state, a disconnected state, or a bypass state. The power storage system further includes a controller coupled to each of the marine battery systems. The controller is configured to retrieve a preferred fault action for the marine battery systems, and in response to detection of a fault condition in the marine vehicle, control at least one three-position contactor of the marine battery systems according to the preferred fault action. The preferred fault action includes operating the marine battery system in the disconnected state or operating the marine battery system in the bypass state.

According to another implementation of the present disclosure, a method for operating a power storage system for a marine vehicle is provided. The method includes retrieving a preferred fault action for marine battery systems configured to provide energy to a marine vehicle load. Each of the marine battery systems includes a battery and a three-position contactor configured to operate the marine battery system in one of a connected state, a disconnected state, or a bypass state. In response to detection of a fault condition in the marine vehicle, the method further includes controlling at least one three-position contactor of the plurality of marine battery systems according to the preferred fault action. The preferred fault action comprises operating the marine battery system in the disconnected state or operating the marine battery system in the bypass state.

According to yet another implementation of the present disclosure, a power storage system for a marine vehicle is provided. The power storage system includes marine battery systems configured to provide energy to a marine vehicle load. Each marine battery system includes a battery and a three-position contactor configured to operate the marine battery system in one of a connected state, a disconnected state, or a bypass state. The power storage system further includes a controller coupled to each of the marine battery systems. The controller is configured to detect at least one of the marine battery systems has reached a minimum threshold state of charge, and to control an operational state of the at least one of the marine battery systems using the three-position contactor.

BRIEF DESCRIPTION OF THE DRAWINGS

The present disclosure is described with reference to the following Figures. The same numbers are used throughout the Figures to reference like features and like components.

FIG. 9A is a block diagram of a marine battery system according to another exemplary implementation of the present disclosure.

FIG. 9B is a block diagram of the marine battery system of FIG. 9A operating in a bypass mode.

FIG. 9C is a block diagram of the marine battery system of FIG. 9A operating in a safe mode.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
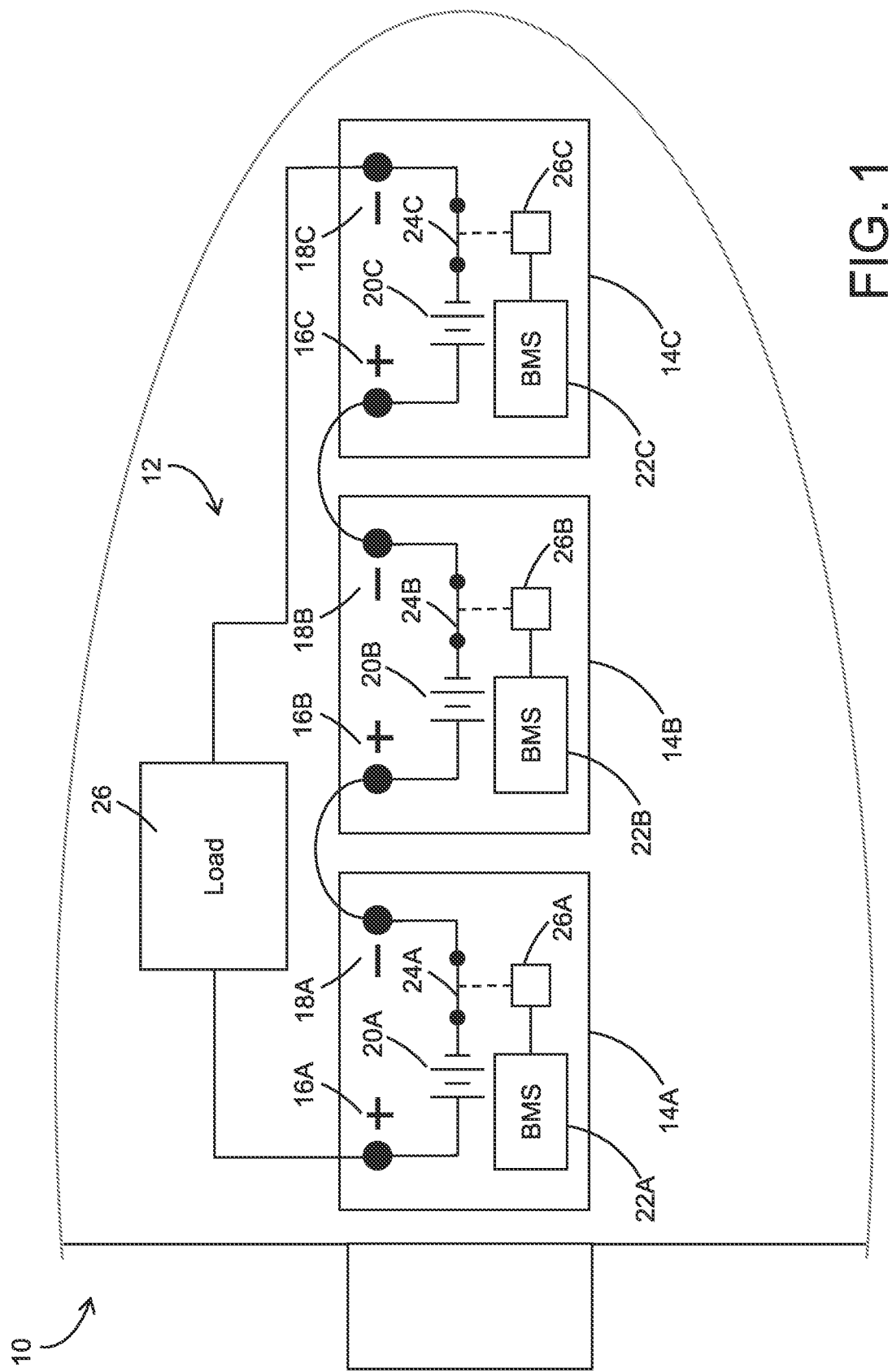
FIG. 1 is a block diagram illustrating a marine vessel including a prior art power storage system.
Figure 2:
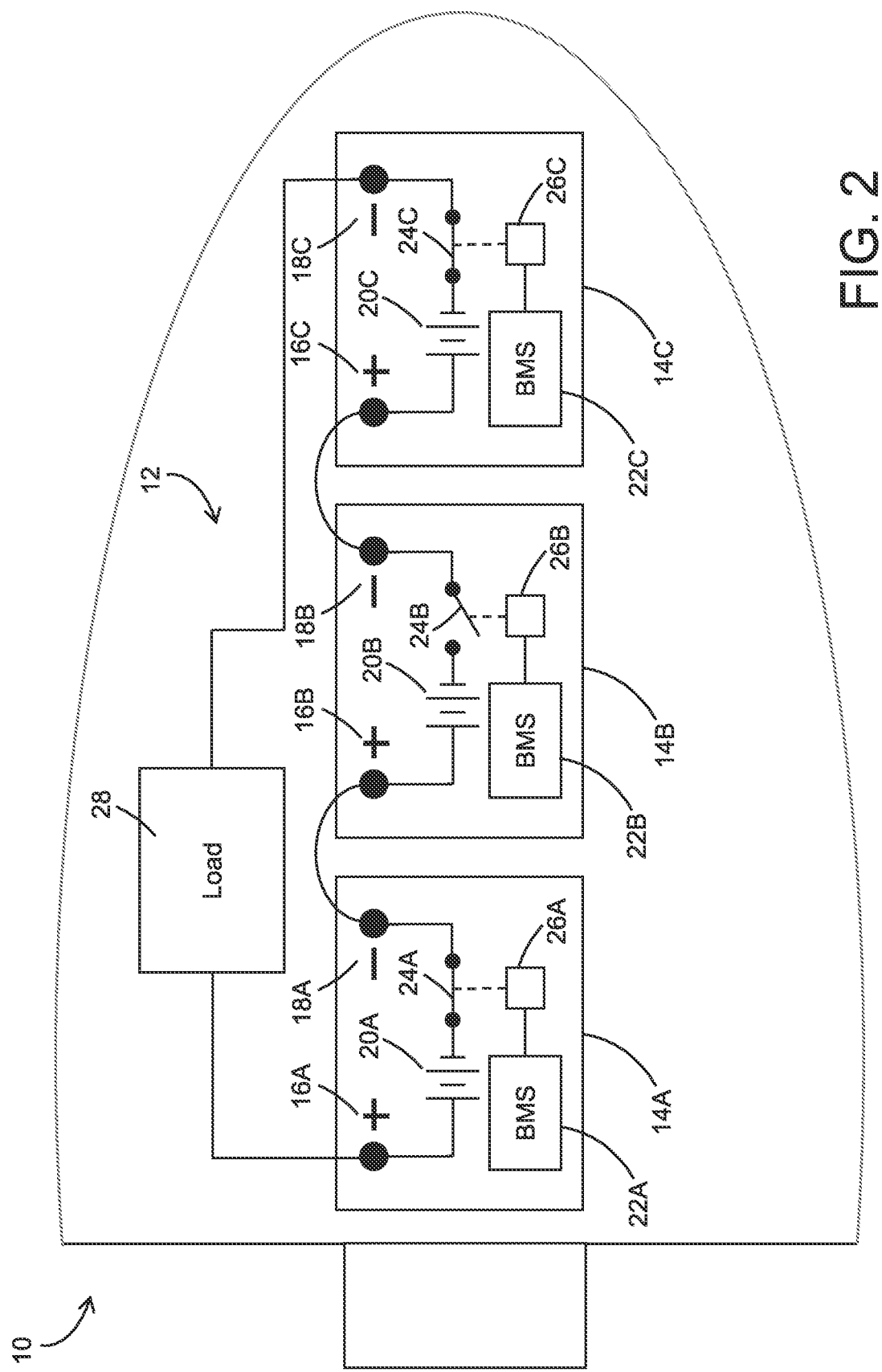
FIG. 2 is another block diagram of the marine vessel and prior art power storage system of FIG. 1.

FIGS. 1 and 2 depict a marine vessel 10 with a conventional power storage system 12. The power storage system 12 is shown to include three rechargeable battery systems 14A, 14B, 14C. The battery systems 14A-14C are arranged in a series configuration and are in electrical communication with a load 26 to discharge current to power the load 26. In various implementations, the load 26 may be any device or system on the marine vessel 10 that receives energy from the power storage system 12. For example, the load 26 may include, but is not limited to, engine starting systems, audio systems, windlasses, depth finders, fish locaters, and appliances. In further implementations, the power storage system 12 may provide energy to a propulsion device (e.g., an electric motor) that drive the marine vessel 10.

Each battery system 14A-14C is shown to include a positive terminal 16A, 16B, 16C, a negative terminal 18A, 18B, 18C, and a battery 20A, 20B, 20C. Each battery 20A-20C includes all the typical components of a battery cell, namely, a cathode, an anode, an electrolyte, and a separator. In an exemplary implementation, each battery 20A-20C is a lithium ion battery with an intercalated lithium ion compound utilized as the cathodic material and graphite utilized as the anodic material.

Each battery system 14A-14C is further shown to include a battery management system (BMS) 22A, 22B, 22C. Each BMS 22A-22C may include both a processor or processing component and a rule storage or memory component. The rule storage or memory component may be any suitable storage mechanism, including, but not limited to, ROM, RAM, or flash memory. Each BMS 22A-22C is further shown to be communicably coupled to a switch operator 26A, 26B, 26C that controls the position of a two-position contactor or internal disconnect relay 24A, 24B, 24C. The switch operators 26A-26C are configured to receive control signals from the BMS 22A-22C, and responsive to the control signals, to move the two-position contactors 24A-24C between a connected or closed position (depicted in FIG. 1) and a disconnected or open position (depicted in FIG. 2 and described in further detail below). When each of the two-position contactors 24A-24C in the battery systems 14A-14C are in the connected position, the total voltage provided by the power storage system 12 is additive. For example, if each battery system 14A-14C provides a maximum of 50 V, the maximum total voltage of the power storage system 12 is 150 V. Although FIGS. 1 and 2 depict a power storage system 12 for a marine vessel 10 with three battery systems 14A-14C, in an exemplary implementation, the power storage system 12 may include six battery systems to provide a maximum total voltage of 300 V.

The present inventor has recognized that lithium ion batteries of the like utilized in marine vessels are susceptible to thermal runaway, particularly if water enters a sealed battery enclosure and reacts with lithium. Thermal runaway is a potentially catastrophic condition driven by a chain of exothermic reactions in which current flowing through the battery causes the battery temperature to rise, which in turn increases the current with a further rise in temperature. In a worst case scenario, thermal runaway can result in violent combustion or explosion, therefore many lithium-based batteries include internal monitoring systems that are configured to detect adverse conditions (e.g., battery enclosure temperature over a maximum threshold, battery voltage over a maximum threshold, battery current over a maximum threshold) and disconnect the batteries if a threshold is exceeded.

However, when the batteries are connected in a series configuration, as is depicted in FIGS. 1 and 2, moving any of the two-position contactors 24A-24C to a disconnected position results in a complete loss of electrical power to the load 28 from the power storage system 12. For example, FIG. 2 depicts the contactor 24B in the disconnected position. This interruption creates an open circuit condition in which the voltage across the power storage system 12 drops to 0 V. If, as is becoming more common, the power storage system 12 is used for electric propulsion for the marine vessel 10, the open circuit condition can result in a complete loss of propulsion for the marine vessel 10, potentially stranding the marine vessel 10 in a body of water without the means to return to shore. The present inventor has therefore recognized that a power storage system that both protects the system against damage when an adverse condition is detected and, if possible, prevents a total loss of propulsion in the event of a detected adverse condition would be useful. In addition, the present inventor has recognized that a single battery system for marine vessels that may be safely utilized for power storage systems arranged in both series and parallel configurations would be useful.

Figure 3:
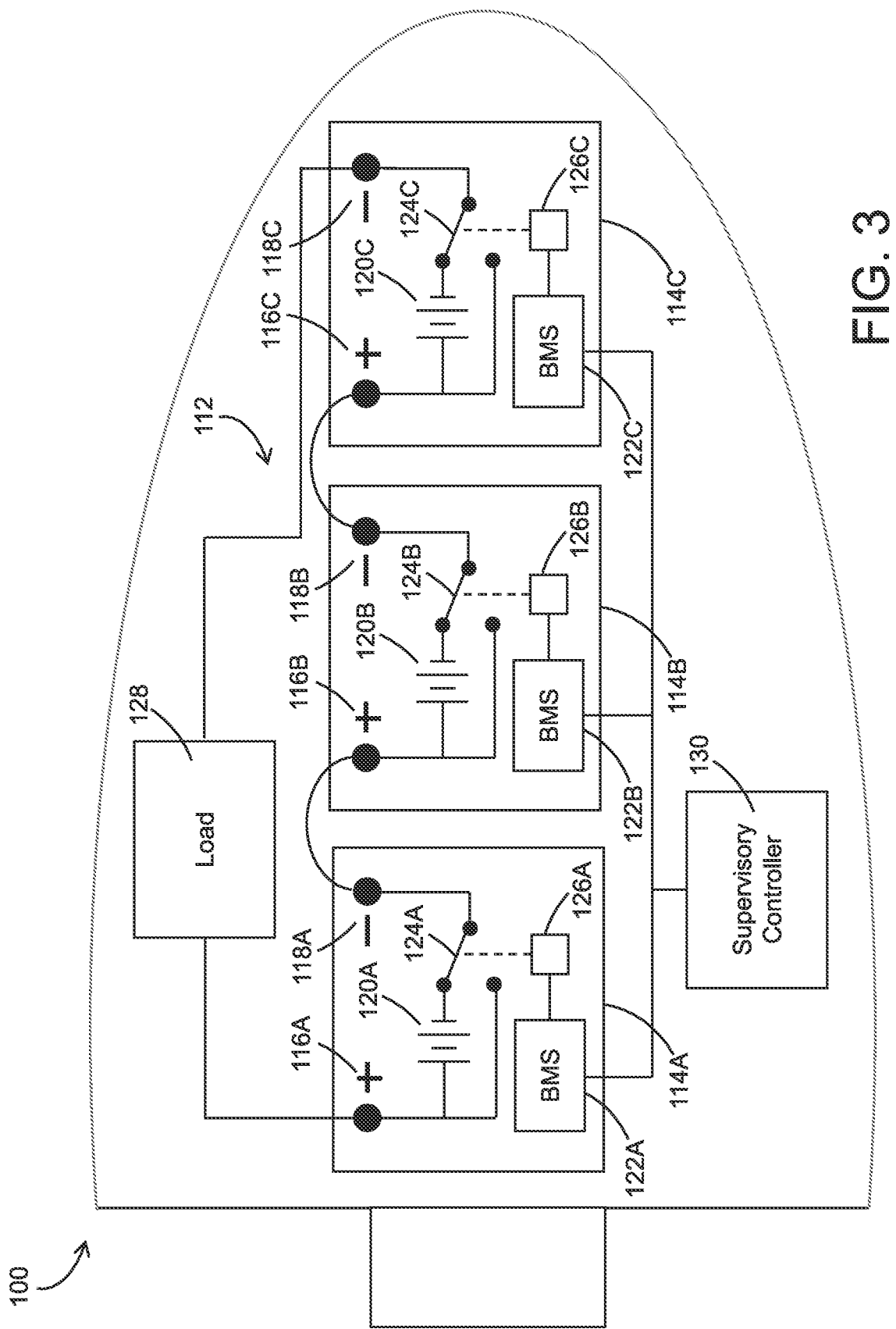
FIG. 3 is a block diagram illustrating a marine vessel including a power storage system according to an exemplary implementation of the present disclosure.
Figure 4:
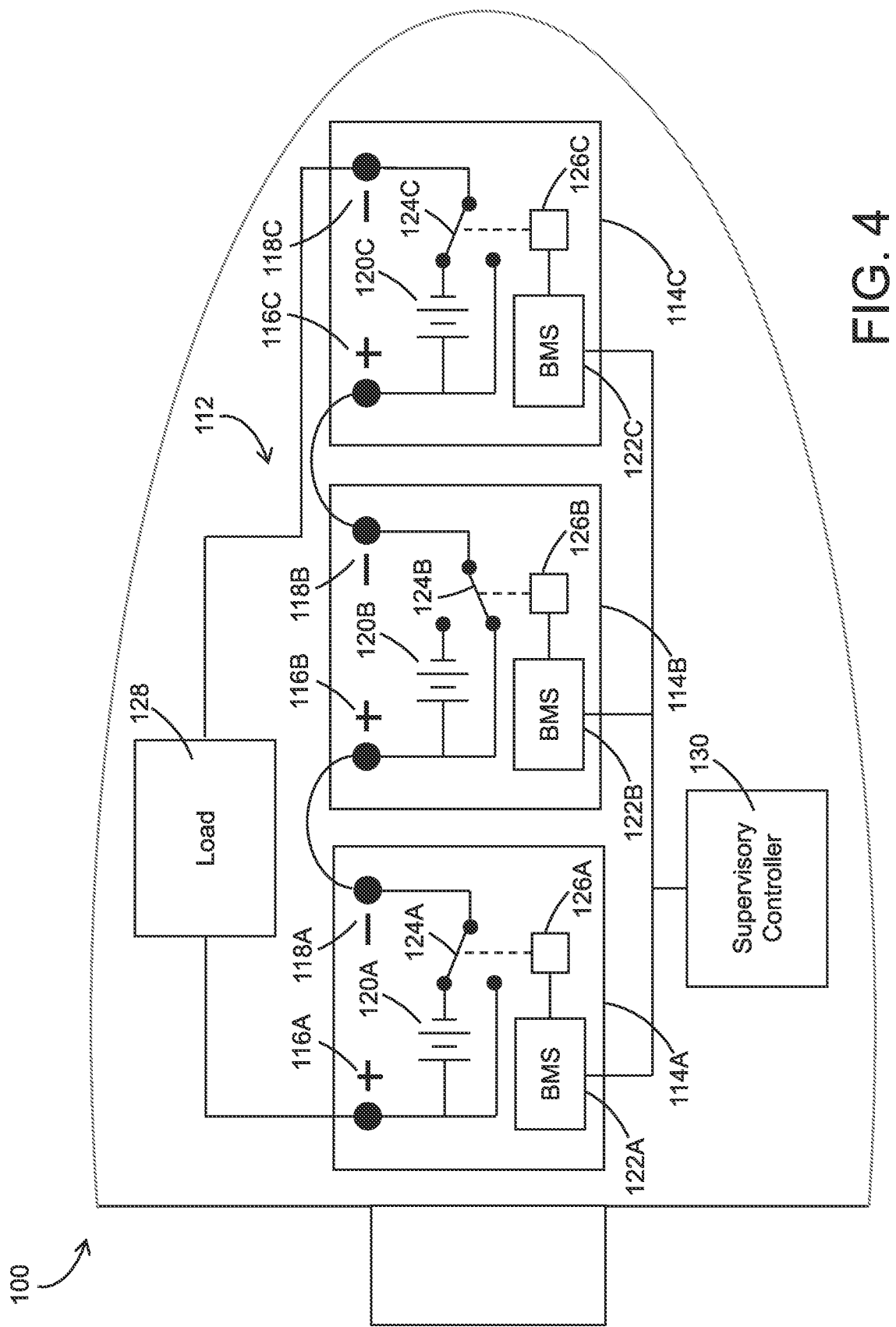
FIG. 4 is a block diagram of the marine vessel and power storage system of FIG. 3 operating in a bypass mode.
Figure 5:
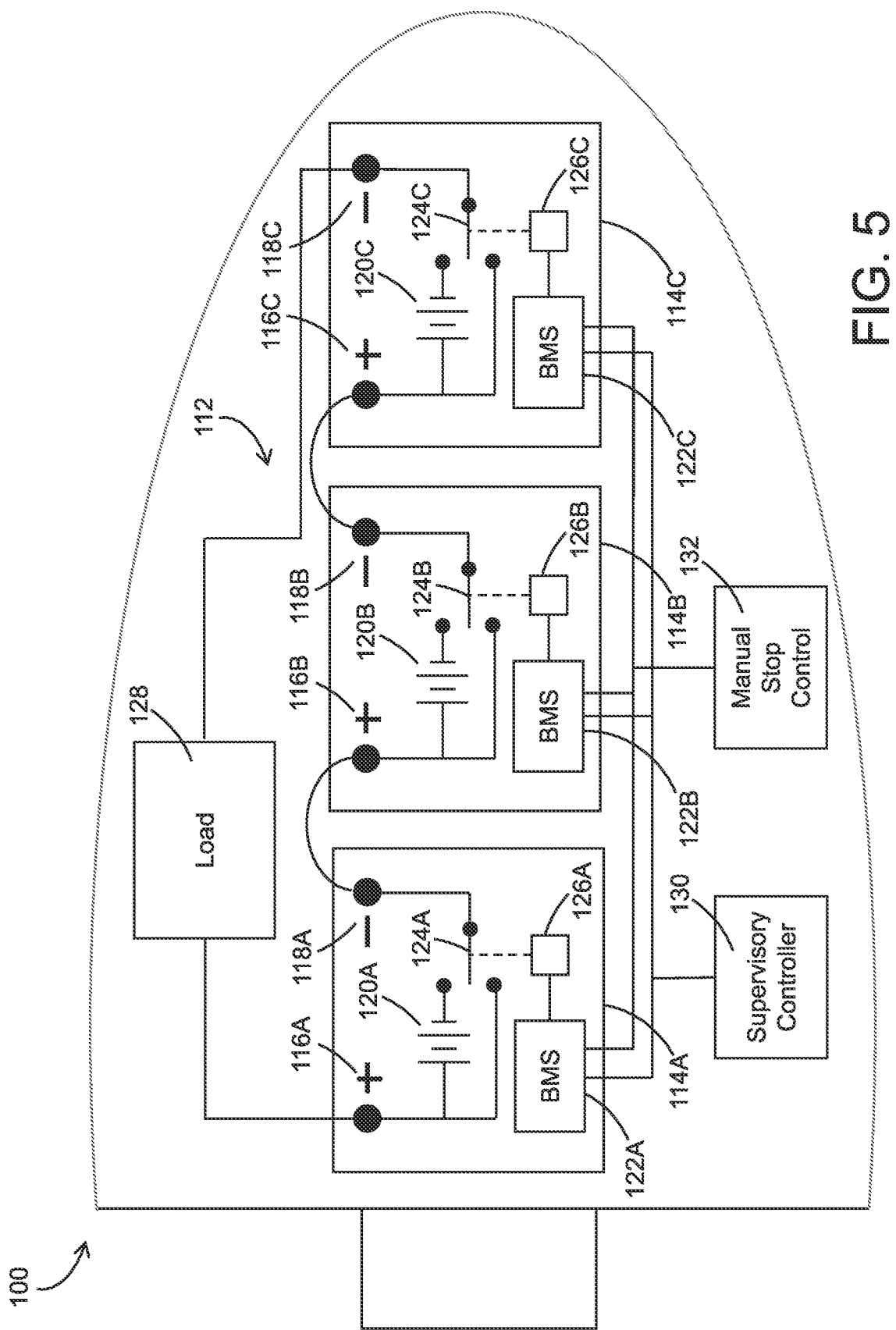
FIG. 5 is a block diagram of the marine vessel and power storage system of FIG. 3 operating in a safe mode.

FIGS. 3-5 depict a marine vessel 100 with an improved power storage system 112 in a variety of operational modes. The power storage system 112 is shown to include three rechargeable battery systems 114A, 114B, 114C. As will be described in further detail below, FIG. 3 depicts a situation in which each of the battery systems 114A-114C of the power storage system 112 is operating in a connected mode, FIG. 4 depicts a situation in which the battery system 114B of the power storage system 112 is operating in a bypass mode, and FIG. 5 depicts a situation in which each of the battery systems 114A-114C is operating in a safe mode.

The battery systems 114A-114C are shown to be arranged in a series configuration and are in electrical communication with a load 126 to discharge current to power the load 126. In an exemplary implementation, the load 126 is identical or substantially similar to the load 26 of the marine vessel 10, described above with reference to FIG. 1. For example, the load 126 may include an electric propulsion system for the marine vessel 100.

Like the battery systems 14A-14C of FIGS. 1 and 2, each of the rechargeable battery systems 114A-114C is shown to include a positive terminal 116A, 116B, 116C, a negative terminal 118A, 118B, 118C, and a battery 120A, 120B, 120C located therebetween. Each battery 120A-20C includes all the typical components of a battery cell, namely, a cathode, an anode, an electrolyte, and a separator. In an exemplary implementation, each battery 120A-120C is a lithium ion battery with an intercalated lithium ion compound utilized as the cathodic material and graphite utilized as the anodic material. In addition, each battery system 114A-114C is further shown to include a battery management system (BMS) 122A, 122B, 122C. Each BMS 122A-122C may include both a processor or processing component and a rule storage or memory component. The rule storage or memory component may be any suitable storage mechanism, including, but not limited to, ROM, RAM, or flash memory. Each BMS 122A-122C is shown to be communicably coupled to a switch operator 126A, 126B, 126C such that the switch operators 126A-126C receive control signals from the BMS 122A-122C.

However, in contrast to the battery system 14A-14C of FIGS. 1 and 2, each of the rechargeable battery systems 114A-114C is shown to include a three-position contactor 124A, 124B, 124C. Each three-position contactor 124A-124C is movable by the switch operators 126A-126C between a connected or closed position (depicted in FIG. 3), a disconnected or open position (depicted in FIG. 5) and a bypass position (depicted in FIG. 4).

As depicted in FIG. 3, when each of the three-position contactors 124A-124C is in the connected position, the total voltage provided by the power storage system 112 is additive, and if each battery system 114A-114C provides a maximum of 50 V, the maximum total voltage of the power storage system 112 is 150 V. In a typical implementation in a marine vessel, the power storage system may include six battery systems to provide a maximum total voltage of 300 V.

Each of the rechargeable battery systems 114A-114C is further shown to be communicably coupled to a supervisory controller 130 that is external to the battery systems 114A-114C using a controller area network (CAN). The supervisory controller 130 may include both a processor or processing component and a rule storage or memory component. In an exemplary implementation, the supervisory controller 130 is configured to monitor various systems and parameters of the marine vessel 100 and, upon detection of a fault condition (e.g., a failure of a high voltage isolation system, a break in a safety interlock loop), instruct the battery systems 114A-114C to operate in bypass or disconnected modes, depending on the characteristics of the power storage system 112 and the severity of the fault condition. Further details regarding this process are included below with reference to FIG. 7.

Figure 6:
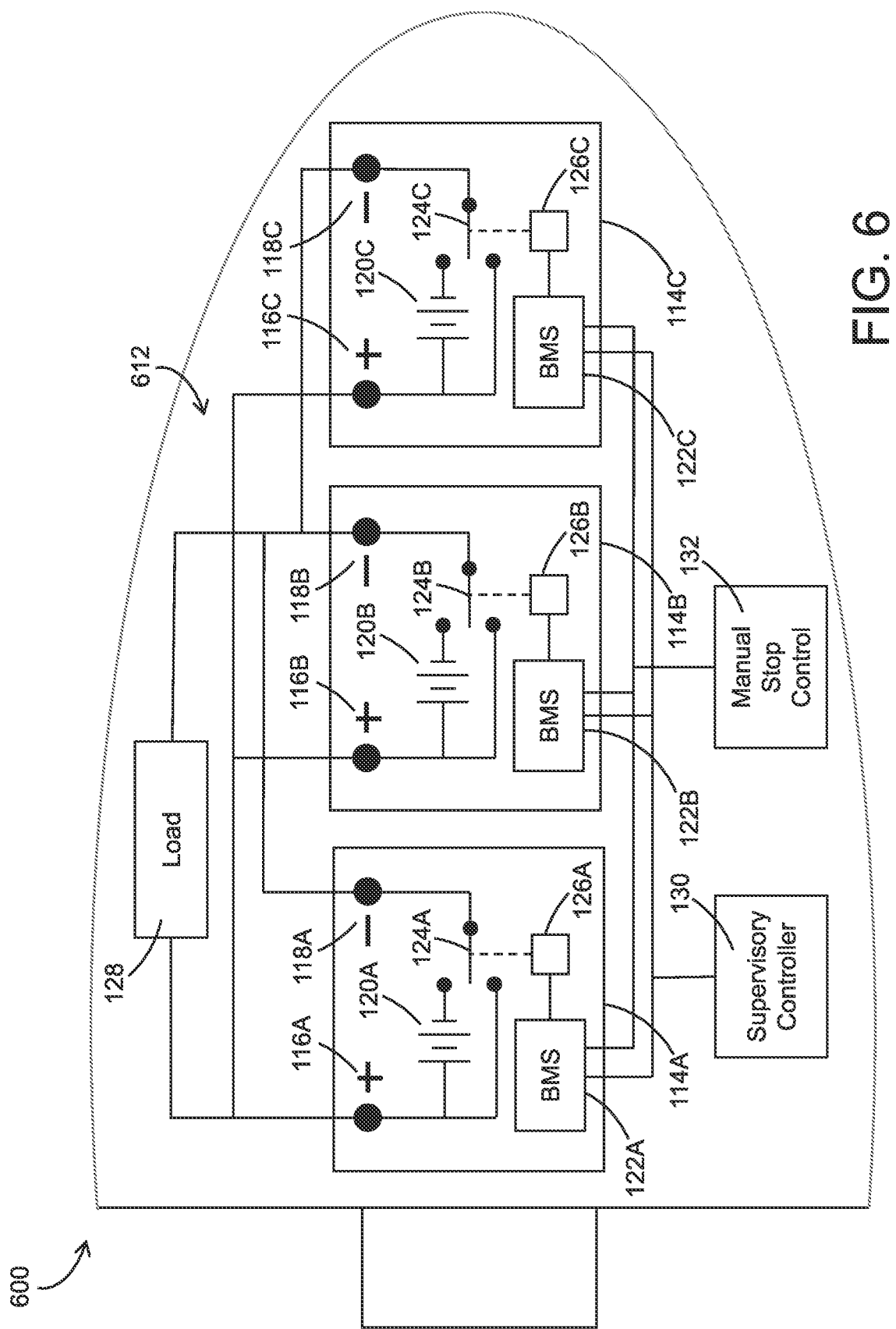
FIG. 6 is a block diagram illustrating a marine vessel including a power storage system according to another exemplary implementation of the present disclosure.

The supervisory controller 130 may be configured to store a preferred fault action for the battery systems 114A-114C. For example, if the battery systems 114A-114C are arranged in the power storage system in a series configuration, as is depicted in FIGS. 3-5, the supervisory controller 130 may be configured to command the BMS 122A-122C to move the three-position contactors 124A-124C to a bypass position in the event of a fault (e.g., high temperature condition, high voltage condition, high current condition). If the battery systems 114A-114C are arranged in the power storage system in a parallel configuration, as is depicted in FIG. 6, the supervisory controller 130 may be configured to command the BMS 122A-122C to move the three-position contactors 124A-124C to an open position in the event of a fault. In some implementations, the supervisory controller 130 may be omitted from the power storage system 112, and each BMS 122A-122C may store the preferred fault action. For example, the preferred fault action could be internally stored in each BMS 122A-122C during an installation process.

Referring now specifically to FIG. 4, the three-position contactor 124B of the battery system 114B is shown to be in the bypass position such that the power storage system 112 is operating in a bypass mode. For example, the supervisory controller 130 may instruct the BMS 122B to operate the switch controller 126B and move the three-position contactor 124B to the bypass position because an enclosure temperature for the battery system 114B exceeds a maximum threshold. Advantageously, moving the three-position contactor 124B to the bypass position does not result in an open circuit condition that cuts all power provided to the load 128. Instead, battery systems 114A and 114C remain connected, such that 100 V, rather than 150 V, is supplied to the load 128. If the load 128 includes an electric propulsion system, this reduction in power may permit the marine vessel 100 to "limp" to shore with reduced functionality. For example, the revolutions per minute (RPM) of the electric propulsion system may be reduced. In further embodiments, if one or more battery systems 114A-114C are operating in a bypass state, the supervisory controller 130 may reduce a charging voltage setpoint to compensate for the reduced number of battery systems 114A-114C operating in the connected state.

If, however, a potentially catastrophic threat to the power storage system 112 arises, the supervisory controller 130 may instruct every BMS 122A-122C to operate the switch controllers 126A-126C and move the three-position contactors 124A-124C to the opened position, as depicted in FIG. 5. For example, a potentially catastrophic threat to the power storage system 112 may arise in the event of a loss of high voltage isolation, ground faults, detection of a collision event by an impact sensor, or detection of a capsizing or sinking event by a high water level sensor in the bilge. In further implementations, the supervisory controller 130 may command each of the three-position contactors 124A-124C to the opened position at key-up to verify that each of the contactors 124A-124C is functional. If the supervisory controller 130 detects that one or more of the three-position contactors 124A-124C is non-functional upon key-up, it may transmit a message to an operator (e.g., via a user interface on a dashboard of the marine vessel).

By moving each of the three-position contactors 124A-124C to the opened position, a high voltage string spanning the battery systems 114A-114C is broken up into smaller segments, eliminating a high voltage potential on the marine vessel 100 and ensuring that the maximum voltage potential is only that of an individual battery system 114A-114C. For example, if each of the battery systems 114A-114C has a maximum voltage of 50 V, by moving each of the three-position contactors 124A-124C to the opened position, the maximum voltage potential of the entire power storage system 112 is only 50 V, which is not harmful to the human body and minimizes the threat of permanent damage to the power storage system 112.

FIG. 5 also depicts the power storage system 112 as including a manual stop control 132 that is coupled to each of the battery systems 114A-114C using an analog input. In the event that the CAN connection between the battery systems 114A-114C and the supervisory controller 130 fails, or in another emergency situation, a user may operate the manual stop control 132 to move each of the three-position contactors 124A-124C to the opened position. In alternative implementations, the manual stop control 132 may be activated by lanyard, a dashboard switch, or by the supervisory controller 130 as a back-up to a failed CAN message.

Turning now to FIG. 6, another marine vessel 600 having a power storage system 612 according to an exemplary implementation of the present disclosure is depicted. In contrast to the power storage system 112 depicted in FIGS. 3-5, the power storage system 612 depicts battery systems 114A-114C arranged in a parallel configuration with the load 128. Although the three-position contactors 124A-124C of the battery systems 114A-114C may be in the closed position under nominal conditions, when a fault condition is detected, the supervisory controller 130 or the manual stop control 132 may command each of the three-position contactors 124A-124C to the opened position, as is depicted in FIG. 6. Advantageously, identical battery systems 114A-114C may be utilized in both the series configuration depicted in FIGS. 3-5, and the parallel configuration depicted in FIG. 6, thus maximizing installation flexibility of the battery systems 114A-114C.

Figure 7:
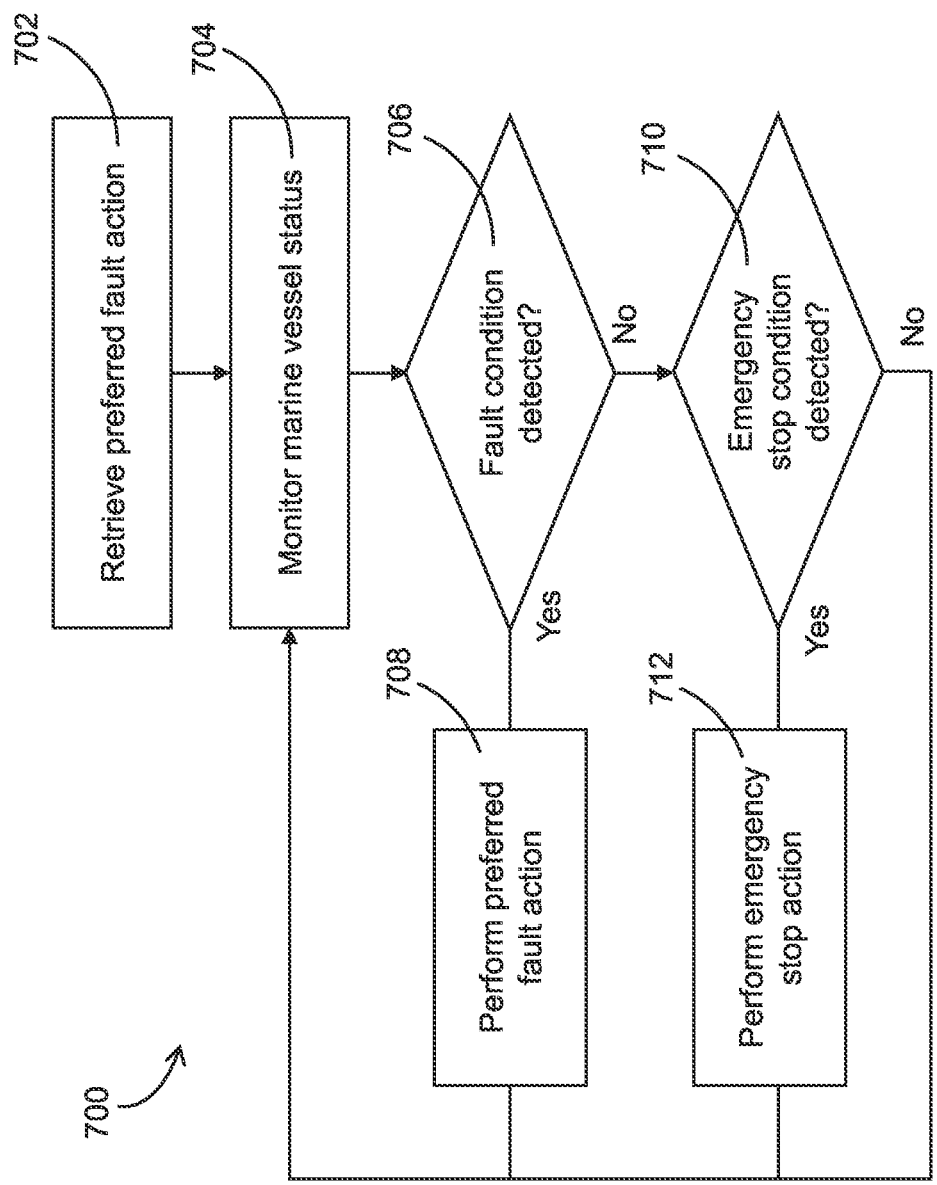
FIG. 7 is a flow chart of a process for operating the power storage systems of FIG. 3 and FIG. 6.

FIG. 7 depicts a process 700 for operating a power storage system, for example, the power storage system 112 arranged in series depicted in FIGS. 3-5, or the power storage system 612 arranged in parallel depicted in FIG. 6. In an exemplary implementation, process 700 is performed at least in part by the supervisory controller 130. In other implementations, process 700 may be performed at least in part by the BMS 122A-122C of each battery system 114A-114C. For the purpose of simplicity, process 700 will be described below exclusively with reference to the supervisory controller 130.

Process 700 is shown to commence with step 702, in which the supervisory controller 130 retrieves a preferred fault action for the power storage system 112, 612. In some implementations, the preferred fault action is stored in memory of the supervisory controller 130 during installation of the power storage system 112, 612. In other implementations, a user may select and store the preferred fault action, for example, via a user interface on the dashboard of the marine vessel. As described above, if the power storage system (e.g., power storage system 112) includes battery systems (e.g., battery systems 114A-114C) arranged in a series configuration, the preferred fault action may include commanding the three-position contactor (e.g., three-position contactors 124A-124C) to a bypass position. If the power storage system (e.g., power storage system 612) includes battery systems (e.g., battery systems 114A-114C) arranged in a parallel configuration, the preferred fault action may include commanding the three-position contactor (e.g., three-position contactors 124A-124C) to an opened or disconnected position.

At step 704, the supervisory controller 130 monitors the status of the marine vessel. In various implementations, step 704 may include monitoring the enclosure temperature, current, and voltage of the battery systems 114A-114C. At step 706, the supervisory controller 130 determines whether a fault condition has occurred in one or more of the battery systems 114A-114C. In an exemplary implementation, the supervisory controller 130 stores threshold values for each of the monitored parameters, and a fault condition is therefore detected when one of the threshold values is exceeded. If the supervisory controller 130 detects a fault condition at step 706, process 700 proceeds to step 708, and the supervisory controller 130 performs the preferred fault action. For example, as described above, the preferred fault action may include commanding the three-position contactor 124A-124C of the one or more battery systems 114A-114C in which the fault is detected to a bypass position or to an opened position, depending on whether the power storage system is arranged in a series or a parallel configuration. In some implementations, step 706 may also include transmitting a fault message to a user interface on the marine vessel dashboard. Once the supervisory controller 130 has performed the one or more fault actions at step 708, process 700 reverts to step 704, and the supervisory controller 130 resumes monitoring the status of the marine vessel.

If, however, the supervisory controller 130 determines at step 706 that a fault condition has not been detected, process 700 proceeds to step 710, in which the supervisory controller 130 determines whether an emergency stop condition has been detected. In various implementations, step 710 may include detection of a loss of high voltage isolation, or a ground fault. If the supervisory controller 130 detects an emergency stop condition at step 710, process 700 proceeds to step 712, and the supervisory controller 120 performs the emergency stop action. In an exemplary implementation, the emergency stop action includes commanding every three-position contactor 124A-126C of every battery system 114A-114C to the opened position such that the power storage system is operating in a safe mode, regardless of whether the power storage system is arranged in a series or a parallel configuration. In this way, any high voltage strings present in the power storage system are broken into smaller voltage segments, each segment having a voltage level which is not harmful to the human body. Commanding all batteries to an open state also removes power from the battery terminals, thereby advantageously eliminating the possibility of arcing or external ignition. In some implementations, step 712 may also include transmitting a fault message to a user interface on the marine vessel dashboard or activating an audible alert. Once the supervisory controller 130 has performed the emergency stop action at step 712, process 700 reverts to step 704, and the supervisory controller 130 resumes monitoring the status of the marine vessel. Similarly, if the supervisory controller 130 does not detect an emergency stop condition at step 710, process 700 concludes by reverting to step 704.

Figure 8:
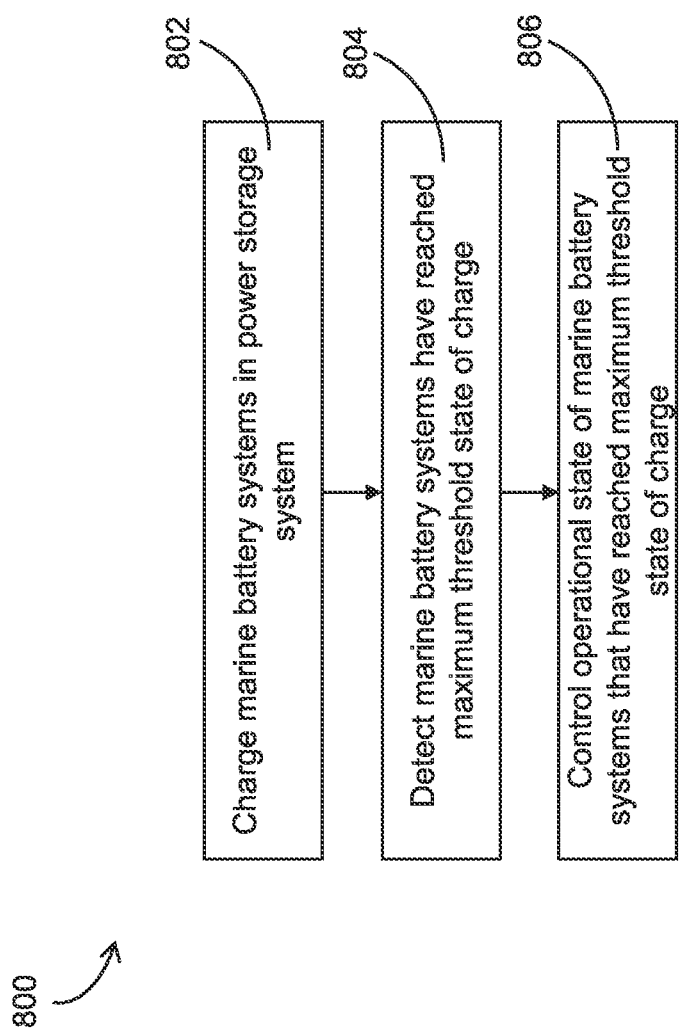
FIG. 8 is a flow chart of a charging process that may be performed by the power storage systems of FIG. 3 and FIG. 6.

Referring now to FIG. 8, a process 800 is depicted for charging a power storage system, for example, the series power storage system 112 depicted in FIG. 3, or the parallel power storage system 612 depicted in FIG. 6. In an exemplary implementation, process 800 is performed at least in part by the supervisory controller 130 of the power storage systems 112, 612. In other implementations, process 800 may be performed by a battery management system 122A-122C of one of the battery systems 114A-114C. For the purpose of simplicity, process 800 will be described below exclusively with reference to the supervisory controller 130.

Process 800 is shown to commence with step 802, in which the battery systems 114A-114C of the power storage system 112 or 612 are operably coupled to a charging source, for example, a dock pedestal. As some battery systems charge faster than others, at step 804, the supervisory controller 130 detects that one or more of the battery systems 114A-114C has reached a maximum threshold state of charge (SOC). In an exemplary implementation, the maximum SOC is stored in the supervisory controller 130 and may be configured by an operator.

Process 800 concludes as the supervisory controller 130 commands the three-position contactors 124A-124C associated with the one or more battery systems 114A-114C that have reached the maximum threshold SOC. If the battery systems 114A-114C are arranged in a series configuration, the supervisory controller 130 commands the three-position contactors 124A-124C to the bypass position. If the battery systems 114A-114C are arranged in a parallel configuration, the supervisory controller 130 command the three-position contactors 124A-124C to the opened position. In either case, reducing the number of connected battery systems 114A-114C in the power storage system 112 or 612 once a maximum SOC is achieved enables faster and more efficient charging of the entire power storage system 112 or 612, and prevents overcharging of a fully charged battery.

If the battery systems 114A-114C are arranged in a parallel configuration, a similar process may be implemented upon discharge of the power storage system 612. For example, the supervisory controller 130 may monitor the SOC of each of the battery systems 114A-114C arranged in parallel and command the three-position contactors 124A-124C from the closed position to the opened position once a SOC of the battery system 114A-114C associated with the contactor drops below a minimum threshold SOC. In this way, the battery systems 114A-114C are discharged at a relatively equal rate, and operation at a low SOC that could cause damage to the battery systems 114A-114C is avoided. In some implementations, the BMS 122A-122C may be configured to automatically command the three-position contactors 124A-124C to the opened position once a SOC drops below a minimum threshold SOC without action from the supervisory controller 130.

Referring now to FIGS. 9A-9C, an alternative rechargeable battery system 914 is depicted. In various exemplary implementations, the battery system 914 may be used in place of each of the marine battery systems 114A-114C depicted and described above with reference to FIGS. 3-6, in both series and parallel arrangements. Specifically, FIG. 9A depicts the battery system 914 operating in a closed or connected state, FIG. 9B depicts the battery system 914 operating in a bypass state, and FIG. 9C depicts the battery system 914 operating in an opened or disconnected state.

The battery system 914 is shown to include a positive terminal 916, a negative terminal 918, and a battery 920 located therebetween. The battery 920 may be identical or substantially similar to the battery 120A-120C, as described above. The circuit connecting the positive terminal 916 to the negative terminal 918 across the battery 920 may be opened or closed by switch 924. In contrast to the three-position contactors 124A-124C described above, the switch 924 may be operable in only two positions: closed and opened. In order to achieve the effects of the three-position contactor 124A-124C, a second two-position switch 928 is provided that acts to open or close a bypass circuit that directly connects the positive terminal 916 to the negative terminal 918.

When the first two-position switch 924 is in the closed position and the second two-position switch 928 is in the opened position, battery system 914 operates in the connected state (depicted in FIG. 9A). When the first two-position switch 924 is in the opened position and the second two-position switch 928 is in the closed position, battery system 914 operates in the bypass state (depicted in FIG. 9B). When both two-position switches 924 and 928 are in the opened position, battery system 914 operates in the disconnected state (depicted in FIG. 9C). Both two-position switches 924 and 928 may be moved between positions according to instructions generated by a BMS 922 and operated by a switch controller 926. In an exemplary implementation, the BMS 922 and the switch controller 926 are identical or substantially similar to the BMS 122A-122C and the switch controller 126A-126C, described above with reference to FIGS. 3-6. As such, the BMS 922 operates the battery system 914 according to the processes 700 and 800, described above with reference to FIGS. 7 and 8.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A power storage system for a marine vehicle, comprising:
   a plurality of marine battery systems configured to provide energy to a marine vehicle load and arranged in either one of a parallel configuration and a series configuration with the marine vehicle load, each marine battery system comprising
   a battery;
   a three-position contactor configured to operate the marine battery system in one of a connected state, a disconnected state, or a bypass state;
   a controller coupled to each of the plurality of marine battery systems, wherein the controller is configured to:
   retrieve a preferred fault action for the plurality of marine battery systems; and
   in response to detection of a fault condition in the marine vehicle, control at least one three-position contactor of the plurality of marine battery systems according to the preferred fault action; and
   wherein the preferred fault action is based on arrangement of the plurality of marine battery systems and comprises operating the marine battery system in the disconnected state or operating the marine battery system in the bypass state.

2. The power storage system of claim 1, wherein the preferred fault action comprises operating the battery system in the disconnected state when the plurality of marine battery systems is arranged in the parallel configuration with the marine vehicle load.

3. The power storage system of claim 1, wherein the preferred fault action comprises operating the battery system in the bypass state when the plurality of marine battery systems is arranged in the series configuration with the marine vehicle load.

4. The power storage system of claim 1, wherein the fault condition comprises exceeding a battery enclosure temperature threshold.

5. The power storage system of claim 1, wherein the fault condition comprises exceeding a voltage threshold.

6. The power storage system of claim 1, wherein the fault condition comprises exceeding a current threshold.

7. The power storage system of claim 1, wherein the controller is further configured to:
   in response to detection of an emergency stop condition in the marine vehicle, control each of the three-position contactors to operate each of the plurality of marine battery systems in the disconnected state.

8. The power storage system of claim 7, wherein the emergency stop condition comprises a loss of high voltage isolation.

9. The power storage system of claim 7, wherein the emergency stop condition comprises a ground fault.

10. A method for operating a power storage system for a marine vehicle, the method comprising:
- retrieving a preferred fault action for a plurality of marine battery systems configured to provide energy to a marine vehicle load and arranged in either one of a parallel configuration and a series configuration with the marine vehicle load, wherein each of the plurality of marine battery systems comprises a battery and a three-position contactor configured to operate the marine battery system in one of a connected state, a disconnected state, or a bypass state;
- in response to detection of a fault condition in the marine vehicle, controlling at least one three-position contactor of the plurality of marine battery systems according to the preferred fault action; and
- wherein the preferred fault action is based on arrangement of the plurality of marine battery systems and comprises operating the marine battery system in the disconnected state or operating the marine battery system in the bypass state.

11. The method of claim 10, wherein the preferred fault action comprises operating the battery system in the disconnected state when the plurality of marine battery systems is arranged in the parallel configuration with the marine vehicle load.

12. The method of claim 10, wherein the preferred fault action comprises operating the battery system in the bypass state when the plurality of marine battery systems is arranged in the series configuration with the marine vehicle load.

13. The method of claim 10, wherein the fault condition comprises exceeding a battery enclosure temperature threshold.

14. The method of claim 10, wherein the fault condition comprises exceeding a voltage threshold.

15. The method of claim 10, wherein the fault condition comprises exceeding a current threshold.

16. The method of claim 10, further comprising:
- in response to detection of an emergency stop condition in the marine vehicle, controlling each of the three-position contactors to operate each of the plurality of marine battery systems in the disconnected state.

17. The method of claim 16, wherein the emergency stop condition comprises a loss of high voltage isolation.

18. The method of claim 16, wherein the emergency stop condition comprises a ground fault.

19. A power storage system for a marine vehicle, comprising:
- a plurality of marine battery systems configured to provide energy to a marine vehicle load and arranged in either one of a parallel configuration and a series configuration with the marine vehicle load, each marine battery system comprising
  - a battery;
  - a three-position contactor configured to operate the marine battery system in one of a connected state, a disconnected state, or a bypass state;
- a controller coupled to each of the plurality of marine battery systems, wherein the controller is configured to:
  - detect that at least one of the plurality of marine battery systems has reached a minimum threshold state of charge; and
  - control an operational state of the at least one of the plurality of marine battery systems using the three-position contactor, wherein the operational state is based on arrangement of the plurality of marine battery systems.

20. The power storage system of claim 19, wherein:
- controlling the operational state of the at least one of the plurality of marine battery systems using the three-position contactor comprises operating the marine battery system in the disconnected state when the plurality of marine battery systems is arranged in the parallel configuration with the marine vehicle load; and
- controlling the operational state of the at least one of the plurality of marine battery systems using the three-position contactor comprises operating the marine battery system in the bypass state when the plurality of marine battery systems is arranged in the series configuration with the marine vehicle load.

* * * * *